United States Patent
Jaxheimer

[15] 3,697,970
[45] Oct. 10, 1972

[54] ELECTRICAL METER READING SYSTEM

[72] Inventor: William W. Jaxheimer, 139 Wall Street, Kingston, N.Y. 12401

[22] Filed: June 17, 1970

[21] Appl. No.: 46,857

[52] U.S. Cl. ................. 340/183, 340/151, 340/204
[51] Int. Cl. .......................................... G08c 15/06
[58] Field of Search .. 340/183, 182, 150, 151, 152 T, 340/408, 204; 179/2 A; 178/2 D

[56] References Cited

UNITED STATES PATENTS

| | | | |
|---|---|---|---|
| 1,800,019 | 4/1931 | Hewett | 340/151 |
| 2,165,892 | 7/1939 | Green et al. | 340/183 |
| 3,531,771 | 9/1970 | Jaxheimer et al. | 340/151 |
| 1,802,643 | 4/1931 | Floyd | 179/2 A |

Primary Examiner—John W. Caldwell
Assistant Examiner—Robert J. Mooney
Attorney—J. Harold Kilcoyne

[57] ABSTRACT

A telemetering system for sequentially interrogating a plurality of meters and successively transmitting the data thereon to a remote station for suitable processing, such as the sequential reading of meters indicating the consumption of electrical energy, gas, water, and similar meters, and transmitting the readings by encoded electrical signals to a central station or other location where the readings may be recorded and stored for future processing or may be fed directly to a suitable computer for computation, recording, and billing for the service rendered. An encoder provides electrical pulses corresponding to the reading on each meter dial and the dial readings are sequentially encoded and transmitted to the processing station. After all dials of a meter have been read, a coded pulsed identification is transmitted indicating the meter just read. When there is only one meter at a reader location, the reading and information encoding is followed by a transfer signal sent from the meter just completed to the next meter location in the sequence to energize the reader at this latter meter location. Should this latter meter location be out of operation, the transfer signal is transmitted to the next sequential meter reader until an operative meter is reached. The interrogating, encoding, and transmitting, as previously explained, is then repeated until the entire sequence of meters has been read. When there is a plurality of meters at one location, only one master encoder and one master meter and dial selector are required for all meters at that location, provided the master units are built to read and transmit the number of meters thus grouped together. If the master unit is built to handle more meters than those in the group, provision is made to transmit the transfer signal when all meters in the group have been read, thus avoiding needless waiting for completion of a reading cycle longer than that required for the actual meters in the group.

15 Claims, 4 Drawing Figures

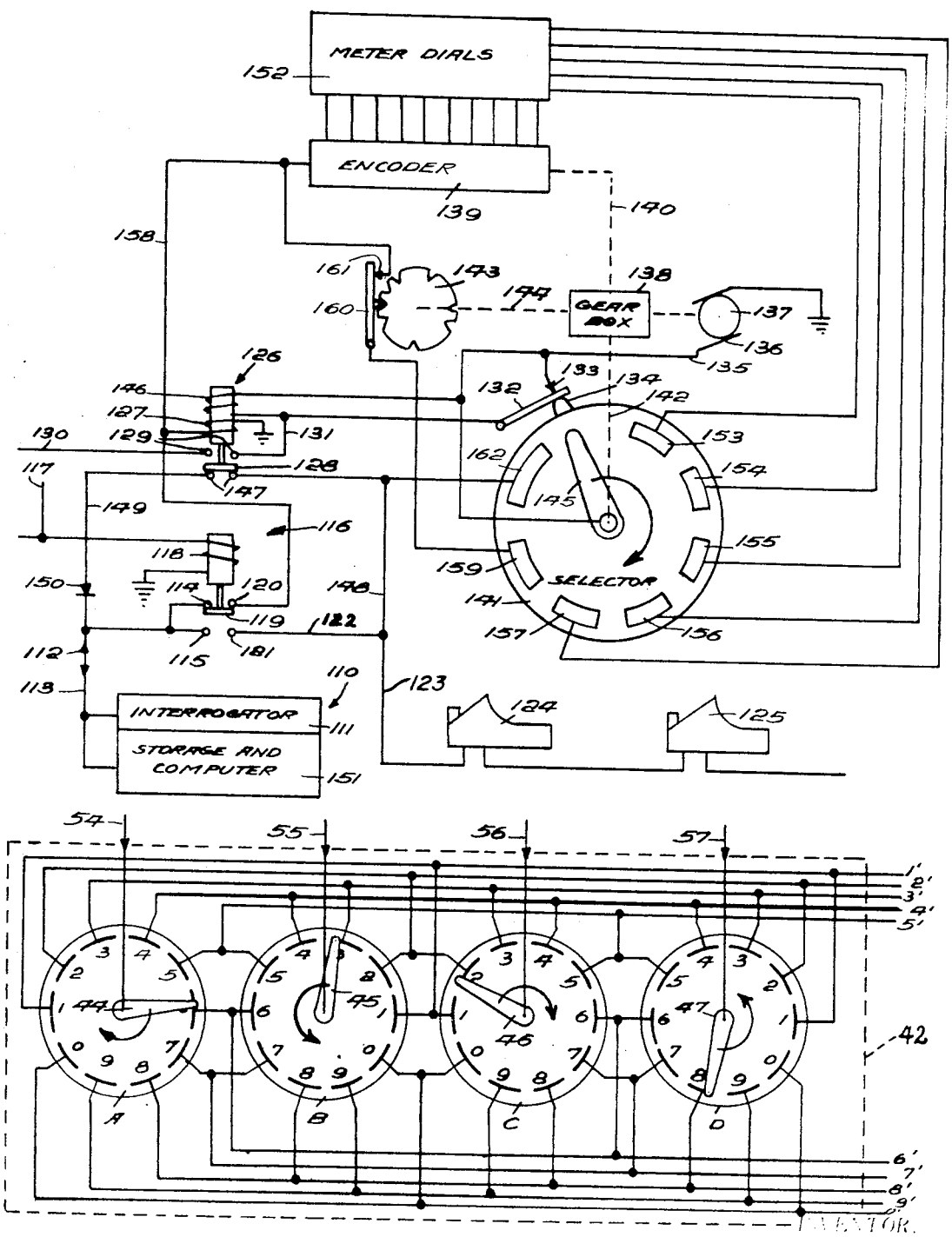

ELECTRICAL METER READING SYSTEM

FIELD OF INVENTION

This invention pertains to plural meter reader-transmitter telemetering systems and particularly to such systems wherein the plurality of meters are read sequentially automatically after an initial read-out signal is sent from the receiving station, with provision for by-passing any nonoperative meter in the sequence.

BACKGROUND OF INVENTION

Meter reading telemetering systems of this type have been proposed, such as that in the present inventor's joint copending application Ser. No. 710,378, now U.S. Pat. No. 3,531,771, wherein each meter can be selectively read in response to a meter identifying read-out signal, so that each meter may be read in succession. Such systems are not fully automatic for a sequence of meters. Telemetering systems which automatically read a sequence of meters also have been proposed, such as that in Haddad U.S. Pat. No. 2,335,755 wherein the digital readings of the meter are transmitted by analog encoding and decoded at the processing station. These involve rather complicated or at least larger than necessary encoding and decoding, as well as somewhat complicated transfer or advance devices and circuitry.

SUMMARY OF INVENTION

The present improved telemetering system comprises a meter reading mechanism and circuit which includes an encoding arrangement for each dial of a meter which is advanced concurrently with the dial indicator during the normal metering process. When a transmittal of the encoded meter reading is desired, a read-out energizing signal is sent to a read-out relay coil. This closes the relay circuit and energizes a read-out mechanism operating motor. As the motor begins to operate the read-out mechanism energizes a relay holding coil so that the relay remains closed after the initial read-out energizing signal has ceased and it remains energized until the read-out cycle has been completed. On completion of a read-out cycle, the read-out mechanism automatically sends a read-out energizing transfer signal to the next successive meter reading device in the sequence and shortly thereafter automatically deenergizes the relay holding coil of the first read-out device, thereby causing this relay to open. This deenergizes the operating motor of the first device and completes the read-out cycle. This procedure is automatically repeated until all meters in the system have been read.

The read-out device is connected to the power source outside the meter as such, so that its operation in no way interferes with or affects the operation of the meter. At times a meter may not be operative, as when a house may be disconnected. When this occurs, it is desirable that the meter reading be by-passed for that meter. This is readily accomplished with the present device by a by-pass relay which is connected for energization from the house line side of the meter, and, when energized, closes a circuit for its meter reader, while, when deenergized, it closes a circuit which shunts out its meter reader and connects the interrogating signal circuit to a read-out transfer signal line connected to the next successive meter reader.

The encoding mechanism can be any suitable structure and circuit to provide the transmittal of a number of pulses to the receiving station corresponding to the digital reading of the dial being read and also providing a series of spaced pulses corresponding in spaced sequential spacing to digits identifying the meter being read. Such an encoding and read-out transmitting mechanism and circuit may comprise the device disclosed and claimed in the applicant's copending application Ser. No. 710,378, filed Mar. 4, 1968, now U.S. Pat. 3,531,771, or any other suitable identifying number encoder.

An object of this invention is to provide an improved telemetering meter reading system.

Another object of this invention is to provide an improved automatically sequential telemetering meter reading of a plurality of meters in a system.

A further object of this invention is to provide an improved telemetering meter reading of a plurality of meters which automatically sequentially reads and identifies each operatively connected meter in the system and by-passes any disconnected meter.

Further objects and advantages of this invention will be apparent from the following description referring to the accompanying drawings, and features of novelty which characterize this invention will be pointed out with particularity in the claims appended to and forming a part of this specification.

BRIEF DESCRIPTION OF FIGURES OF DRAWINGS

Figure 1:
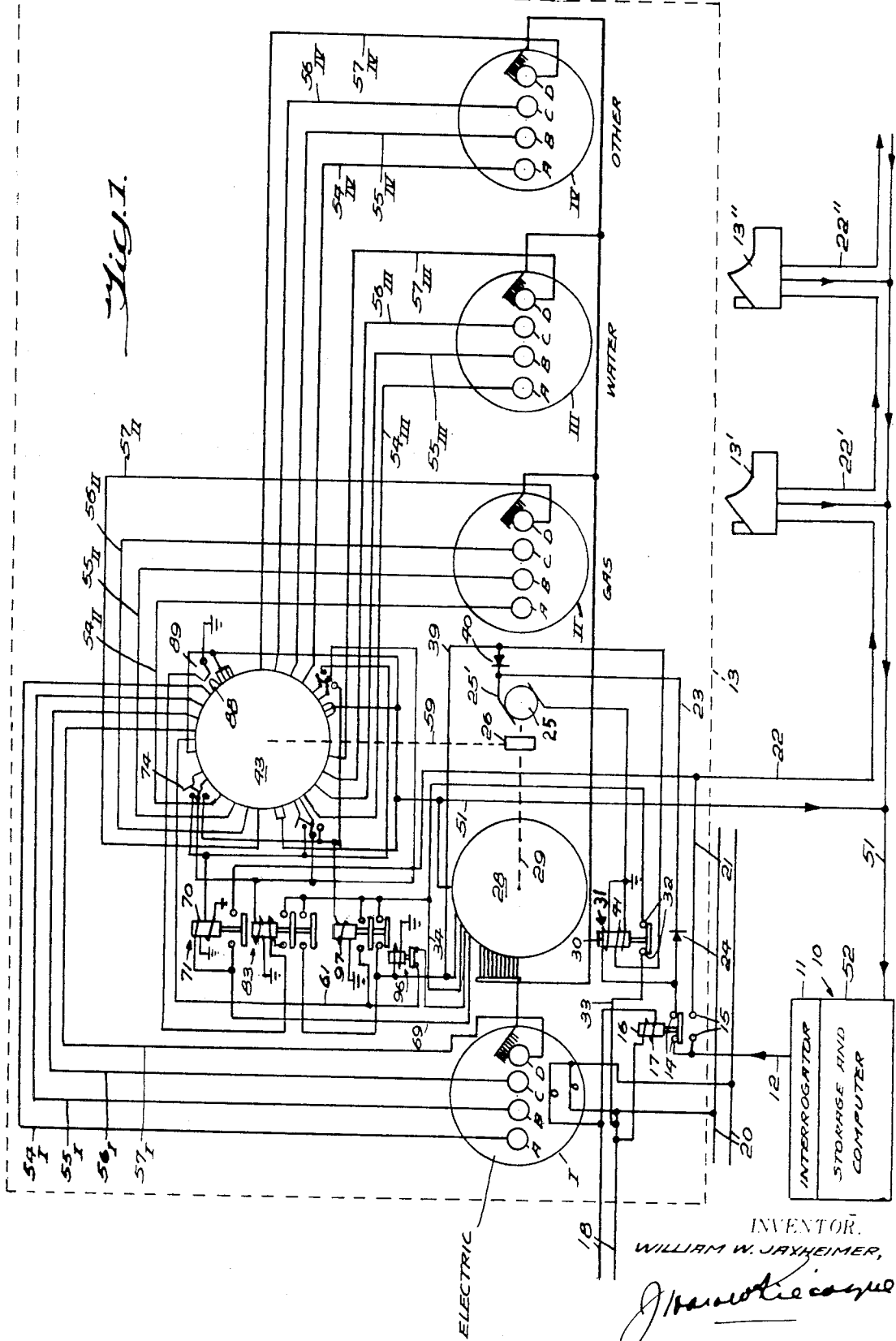
FIG. 1 is a schematic diagram illustrating a telemetering system embodying the present invention for reading meters at remote locations.

FIG. 3 is an enlarged detailed view, schematically illustrating the meter dial reader and interconnections for the meters of the FIG. 1 system; and FIG. 4 is a schematic diagram illustrating the present invention applied to a telemetering system as disclosed in copending application Ser. No. 710,378, now U.S. Pat. 3,531,771, filed Mar. 4, 1968, in which applicant is a joint inventor.

DETAILED DESCRIPTION OF INVENTION

Figure 2:
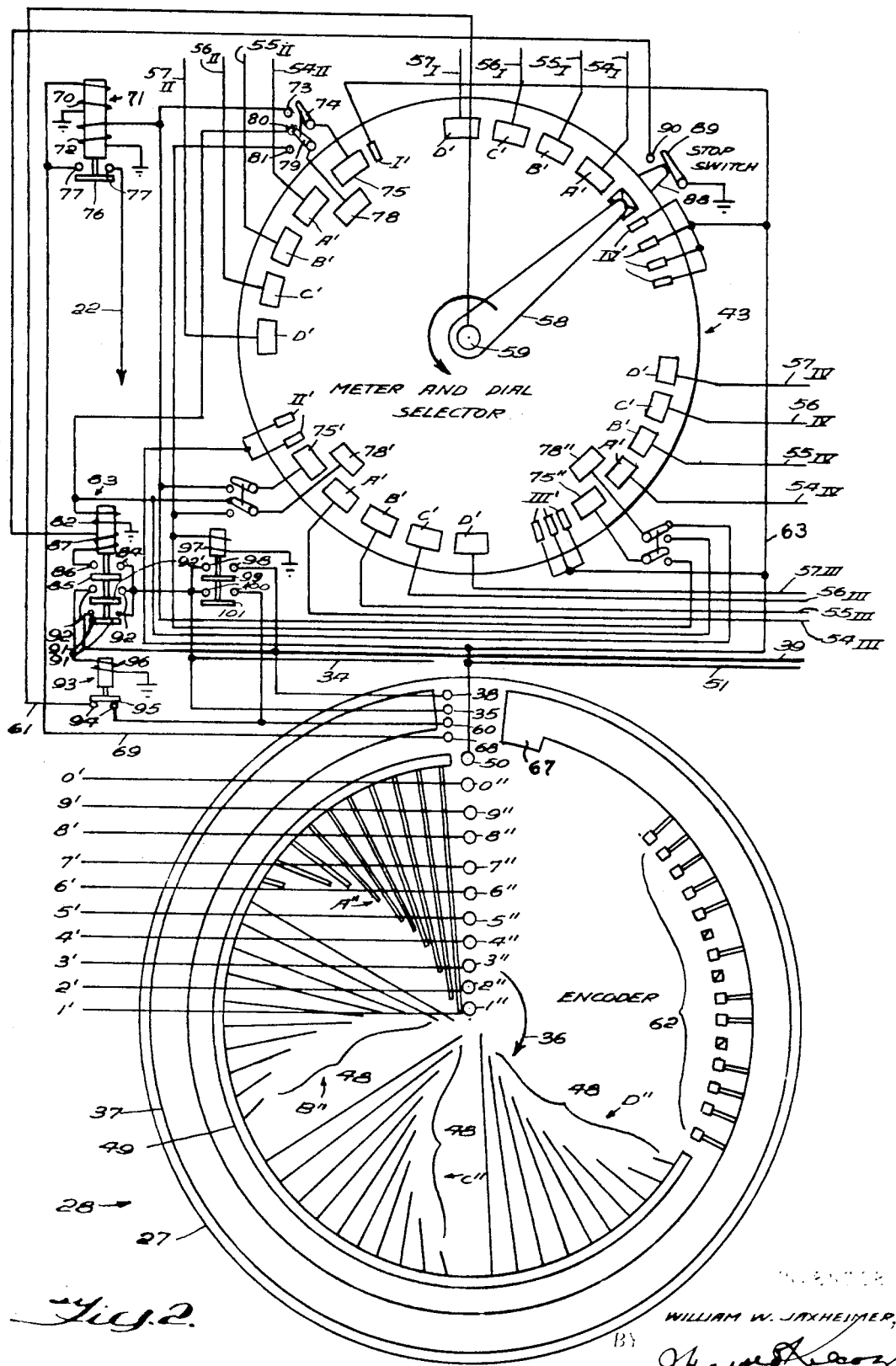
FIG. 2 is an enlarged detailed view schematically illustrating the encoder, meter and dial selector, and transfer relay, with related connections, of the FIG. 1 system.

Referring to the drawings, FIGS. 1, 2, and 3 illustrate an embodiment of an improved telemetering meter reading system according to this invention comprising a system for sequentially reading and identifying a plurality of meters at a single remote location and sequentially reading and identifying meters at a plurality of other remote locations, each of which location may have a plurality of meters which are read and identified, all in response to an initial read-out or interrogation signal from a central station or business office 10. This central station 10 is provided with a suitable interrogator, including a source of electrical power for supplying the initial read-out signal to the system. This electrical source preferably is d.c., as it is used to initiate both energization of a remote read-out relay and a meter-reader actuating motor and particularly since the present system uses electrical pulses as encoded signals for the various readings. Alternating current inherently provides pulses according to its frequency, so that the system must be designed to recognize the information pulses and not to respond to the basic a.c. frequency, with the result that encoding and subsequent utilization of the encoded information is greatly simplified by the use of d.c. Where the system is used for telemetering readings of meters supplied by a.c., a simple full wave rectifier of any suitable conventional type can be used to connect each meter reading unit to the local a.c. supply, thus providing the economic advantages of the d.c. encoding and subsequent utilization of the encoded information. Since such rectifiers and their connections are well known in the art, none is shown in the drawings, it being understood that they would comprise conventional units and circuit connections between the a.c. source and the telemetering system.

In this illustrated embodiment a read-out signal is adapted to be sent from the interrogator 11 at the central station 10 over a line 12 to the first meter location, such as a house 13. At this location, the line 12 is connected to contacts 14 and 15 of a by-pass relay 16. The exciting winding 17 of the by-pass relay 16 is connected directly across the electrical supply line 18 for the house 13 on the house side of an electrical watt-hour meter I. As shown, when the house line 18 is connected to a power supply line 20, the by-pass relay winding is energized and the relay 16 closes the circuit between its contacts 14. This connects the meter-reader to the central station interrogator line 12, so that a read-out signal is passed by the relay to the remainder of the meter-reader in house 13.

If, for any reason, the house circuit 18 is disconnected from the power line 20, for example, when the house is vacant and the house circuit is not in use, the by-pass relay winding 17 is not energized. Under these conditions, the relay 16 opens the circuit through contacts 14, thus rendering the meter-reader of house 13 inoperative and nonresponsive to a read-out signal from the central station 10. Also, the deenergized relay 16 closes a by-pass circuit through its contacts 15, whereby the interrogator line 12 is connected therethrough to a by-pass line 21 and by the latter to a read-out transfer line 22 to the sequentially next meter location, such as another house 13' provided with a meter-reader unit similar to that illustrated schematically for house 13. In like manner, should house 13' be disconnected from the power line, its by-pass relay would transmit the read-out signal over transfer line 22' to the sequentially next meter location, such as a third house 13'', etc., until the signal arrived at a house connected to the power line or reached the end of the sequentially connected plurality of meter locations of the telemetering system. In this manner, needless waste of time in reading out-of-service meters and in recording or computing out-of-service meter location readings is avoided.

At a location with the local system 18 connected to the power line 20, the read-out signal passes through relay contacts 14 through a diode rectifier 24 to a meter-reader motor starting line 23 and through a brush 25' to a meter-reader motor 25. This energizes the motor 25, so that it drives gearing in a change-speed gear box 26 which drives an encoding disc 27, FIGS. 1 and 2, of an encoder 28, through a drive shaft 29.

Simultaneously, the read-out signal also passes to a coil 30 of a relay 31 and energizes coil 30, which actuates relay 31 to close a circuit through its contacts 32. One of these contacts 32 is connected by line 33 to the house circuit 18 and the other contact 32 is connected by line 34 to a brush 35 of encoder 28. As motor 25 begins to drive encoder disc 27 in response to the read-out signal, it rotates the disc clockwise as seen in FIG. 2, indicated by arrow 36, and turns a segmental conducting collector or slip ring 37, mounted on an insulating base of disc 27 into contact with a brush 35. Concurrently therewith, slip ring 37 engages a brush 38, which is connected by line 39 and through a diode rectifier 40 to the motor 25 through motor brush 25'. Diode 24 prevents the house line voltage from line 18 which is thus impressed on motor 25 from passing back over lines 23 and 12 to the central station interrogator.

Line 39 also is connected to a holding winding 41 of relay 31, so that after the disc 27 has turned slip ring 37 into contact with brushes 35 and 38, the holding winding 41 is energized and the relay 31 will remain closed even after the read-out signal from the central station 10 has ceased. Under these conditions, the motor 25 also is energized through the encoder disc slip ring 37, brushes 35 and 38, and line 31, through diode 40 and motor brush 25', and continues to operate after the read-out signal has ceased. The diode 40 prevents the initial read-out signal from passing through line 39 either to the relay holding coil 41 or to the encoding disc slip ring 37 through its brush 38.

The actual meter dial reading and encoding is performed by the combined action and circuitry of a meter dial reader 42, FIG. 3, a meter and dial selector 43, FIG. 2, and the encoder 28, FIG. 2, with the associated relays and motor drive.

Meters generally have a plurality of dials to indicate units, tens, hundreds, thousands, etc., and usually have four or more such dials. For purposes of illustrating this invention, a four dial meter structure is shown, and it is to be understood that wherever the related four parts are shown, a corresponding number of parts would be used for meters having other numbers of dials. Each dial of a meter conventionally is marked in the digits 0–9, with the next succeeding dial similarly marked and having an indicator driven by gearing from the immediately preceding dial indicator in a ratio of one revolution to 10 of the preceding dial indicator.

The reading of such meter dials, be the meters for measurement of electrical energy consumption, gas, water, steam, oil, or other commodity readily measured by dial type meters, can be performed by the meter dial reader device 42, shown in FIG. 3. The four meter dials may either be replaced by or have superposed thereon four reader dials A, B, C, and D, each provided with ten evenly spaced contact elements successively marked with the digits 0–9, corresponding to the same digits in the same respective order on the superposed meter dials. Conventionally, the digits on successive meter dials appear in ascending order in opposite directions on adjacent dials, and the pointers on the meter dials are geared to rotate in opposite directions on adjacent dials in order to provide for rotation of the respective pointer on each dial over the digits in an ascending digital order. Contact arms 44, 45, 46, and 47 are respectively provided for the reader dials A, B, C, and D, each mechanically having a driving connection with the drive shaft of its respective superposed meter dial pointer. The corresponding dial contacts 1–0 on all reader dials are interconnected to dial reader lines 1', 2', 3', 4', 5', 6', 7', 8', 9', and 0', respectively, FIG. 3, and these lines are connected respectively to brushes 1'', 2'', 3'', 4'', 5'', 6'', 7'', 8'', 9'', and 0'' on the encoder 28, FIG. 2. These brushes are mounted in radially spaced array on the encoder disc 27 and are arranged to engage respectively one to ten radial successively shorter contacts 48, for each dial, when the encoder disc 27 is rotated as shown by arrow 36. These contacts 48 are formed of electrically conductive material mounted on an insulating base of disc 27, and all are electrically connected to an arcuate conductive segmental collector or slip ring 49. Four evenly spaced sets A'', B'', C'', and D'' of contacts 48 are provided, corresponding to the four dials A, B, C, and D of each meter. A further brush 50 in the radially spaced array of brushes 1''–0'' is mounted in alignment with collector ring 49, so that rotation of the encoder disc by motor 25 will turn collector ring 49 into contact with brush 50 as the encoding contacts 48 pass in contact with brushes 1''–0''. Brush 50 is the information return brush and is connected to line 51 over which pulse encoded information is returned to the central station 10 for processing in its storage and computer section 52.

As previously explained, when an interrogating read-out signal is sent out from the central station over line 12, the motor 25 is energized and drives the encoder disc 27 through the gear box 26. In order to read successively each dial of each meter at a location and to identify the meter and the dial read, a meter and dial selector 43 is provided having sets of stationary contact segments A', B', C', and D', corresponding respectively to meter dials A, B, C, and D of each meter. A contact segment A' of each set of contacts is connected respectively to one dial contactor 44 of a dial A, and similarly the contact segments B', C', and D' of each set of contacts are respectively connected to one dial contactor 45, 46 and 47. These connections are more clearly shown in FIG. 1, where the contactors 44, 45, 46, and 47 of dials A, B, C, and D of meters I, II, III, and IV, respectively, are indicated as connected to their respective contact segments, FIG. 2, by lines 54$_I$, 55$_I$, 56$_I$, and 57$_I$, lines 54$_{II}$, 55$_{II}$, 56$_{II}$, and 57$_{II}$, lines 54$_{III}$, 55$_{III}$, 56$_{III}$, and 57$_{III}$, and lines 54$_{IV}$, 55$_{IV}$, 56$_{IV}$, and 57$_{IV}$. These lines, without subscripts, are shown in the general dial illustration of FIG. 3. Successive read-out of the dials of the several meters is accomplished through a rotatable contactor 58 of the meter and dial selector 43. This contactor is driven at a speed relative to the speed of the encoder disc such that the disc makes as many revolutions as there are meters to be read for one revolution of contactor 58, in the illustrated example the disc 27 will turn four times as fast as the contactor 58. This speed relationship is provided by suitable gearing in the gear box 26, which drives the contactor 58 by a drive shaft 59.

Energization is supplied to the selector contactor 58 by a brush 60 which is engaged by the slip ring 37 shortly after the motor 25 starts operating. As previously explained, energization from the house lines 18 is applied to slip ring 37 through line 34 and brush 35. Brush 60 is connected by a line 61 to selector contactor 58, so that when the contactor is driven by the motor 25 it successively engages segment contacts A', B', C', and D' connected to dial contactors 44, 45, 46, and 47 of meter I and successively energizes the respective dial contact segment 1–0 with which the dial contactor is in engagement. For example, line 54, FIG. 3, energizes contactor 44 which is in engagement with contact 6 of dial A. This passes the energization over line 6' to brush 6'' of encoder 28. As the disc 27 rotates, the six longest segment contacts 48 of set A'' will sequentially contact brush 6'', and each contact 48 will be temporarily energized, thereby each passing a pulse of energization to the collector ring 49. These pulses are transmitted to brush 50, which is in contact with collector ring 49, and are transmitted over line 51 to be processed at the central station 10, the six pulses indicating that dial A had a measurement reading of six thereon.

Continued rotation of selector contactor 58 will sequentially provide energization to dials B, C, and D of meter I and transmit the readings therefrom to the central station from the encoder contact sets B'', C'', and D'', respectively, in the same manner as explained with reference to dial A.

After the readings of all four dials have been transmitted, continued rotation of encoder disc 27 will sequentially carry a plurality of spaced contacts 62 into engagement with brush 50. These contacts 62 are electrically connected to the slip ring 37 and are energized thereby, so that as each contact 62 engages brush 50 it transmits an electrical pulse thereto which is then transmitted over line 51 to the central station for processing. As shown in FIG. 2, these contacts can be arranged in a large variety of combinations with some unconnected contacts 62 between groups of connected contacts. Thus, groups of pulses can be used to represent a digit, and the unconnected contact provides a spacing between successive digits. For example, in FIG. 2, the first group comprises four contacts which will provide four pulses representative of the digit 4, the next spaced group comprises two contacts representing the digit 2, the next spaced group includes only one contact representing the digit 1, and the final spaced group comprises five contacts representing the digit 5. In this manner, the pulse coded number is 4215. This number identifies the location of the meters read by the meter reader of the system. The same number will be repeated for all four meters I, II, III, and IV at the specific location read and processed by encoder 28. Each encoder can easily be connected to provide a different number for each location. These location identification encoding contacts may conveniently be made separately from the disc 28 and be in the form of a clip attachment in which the contacts 62 are arranged in the previously described pulse forming spaced sequence, with a suitable contact connection to slip ring 37. The encoder disc 28 can thus be a standard structure to which the identification encoding contacts 62 in clip-on form are merely attached as each installation is made. This location identification is transmitted from the encoder while the selector contactor traverses the blank space after passing out of contact with contact segments D'.

It is further necessary to identify the particular meter at the particular location so that the meter reading can be properly related to the quality measured by the meter. This is done by providing a small spaced contact group for each meter adapted to be engaged by the selector contactor 58 after the encoder contacts 62 have all passed under brush 50. The remainder of the space between the last encoder contact 62 and the beginning of slip ring 49 is left blank, so that no further pulses are transmitted from brush 50 during the turning of this part of disc 27 under brush 50. The meters I, II, III, and IV can readily be identified by one, two, three, and four pulses, respectively, spaced from the last of the location pulses from encoder contacts 62. This is conveniently done by small spaced meter identifying contacts I', II', III', and IV' mounted on the insulating base of the selector 43 and all electrically connected by line 63, to the information transmission line 51, so that continued rotation of selector contactor 58, after passing over the blank space following the dial selector contact D', brings contactor 58 in engagement with the meter contact or contacts corresponding to the meter which has just been read, thus sending corresponding meter identifying pulses over line 63 to the information transmission line 51 and the central station 10. These meter number encoding contacts also can be made as clip in units mounted in any suitable manner on the disc 43, so that the meter number can be readily changed if desired.

After all meters at a location have been read, the meter reading system automatically sends a transfer read-out signal to the next meter reading location and turns itself off in a condition ready to start the reading cycle over again when a new interrogation read-out signal is sent out by the central station to the first location. In the meanwhile, each succeeding meter location repeats the complete reading cycle and transmits its reading and identifying information over line 51 to the central station and then sends a transfer read-out signal to the next location and resets itself to its original turned off starting condition. These transfer signal and resetting procedures are accomplished by switching devices which not only assure proper operation when the designed for number of meters is present at the reading location, but even assures correct operation thereof when less than the full number of meters is present at a location without the introduction of erroneous or superimposed plural readings and without loss of time for completion of a full operating cycle of the meter selector 43 to return to its starting position. These are further important aspects of this invention, although less sophisticated circuitry and operation can be utilized, if system costs must be minimized and refined techniques can be sacrificed with comparable loss in operating efficiency and time.

In order to provide the transfer read-out signal on completion of readings at a location, the encoder slip ring 37 is provided with a conductive inwardly extending tab contact 67 on the trailing end thereof, which is adapted to engage a brush 68, without contacting brush 50 after the selector contactor 58 has completely passed out of engagement with the meter identifying contacts I', II', III', or IV'. This provides a momentary energization to brush 68 subsequent to the engagement of the selector contactor 58 with meter identifying contacts I', II', III', or IV', respectively, and before all of the encoder brushes are deenergized and out of contact with other encoder elements, as in the position shown in FIG. 2. This energization of brush 68 is transmitted over line 69 to an operating winding 70 of a transfer signal relay 71. Operation of this relay depends upon whether or not a differential winding 72 thereof is energized concurrently when winding 70 is energized. Winding 72 is connected through a switch contact 73 and pole 74 of a two-pole switch to a segment contact 75 of the meter selector. This type switch and contact 75 are mounted between the meter identifying contact I', II', and III' and the adjacent dial contact A', none being provided after contact IV'. When a meter reading installation is made, the switch pole 74 is closed on its contact 73 if a subsequent meter at that location is to be read and is left open if no further meter reading is to be made at that location during a regular reading cycle. The switch is then left in its respective position, unless the number of meters to be read at that location is changed. Thus, after meter I has been read and contactor 58 turns past contact I', the contactor engages contact 75. If there be a meter II at that location which is to be read, switch pole 74 will be closed on contact 73, and energization from contactor 58 will excite relay winding 72 concurrently with the energization of winding 70 by encoder contact tab 67, brush 68, and line 61. The net result is that the relay 71 will remain in its open position as shown and no transfer signal will be sent over transfer line 22 to the next location. If only meter I is to be read, switch pole 74 is left open as shown, so that engagement of contact 75 by contactor 58 does not energize the relay differential winding 72. Under this condition, when encoder tab contact 67 turns into engagement with brush 68 and energizes relay winding 70, the relay is excited to its closed position, wherein its contactor 76 closes the circuit through contacts 77 and connects line 22 therethrough to line 69. This transmits a transfer read-out signal to transfer line 22 and initiates a read-out cycle at the next meter location, such as house 13'.

After encoder slip ring has completed substantially one rotation, it passes out of engagement with brushes 35, 38, 60 and 68, so that circuits connected thereto no longer are energized from line 34. This breaks energization of motor 25 and of main line relay holding winding 41, so that the entire reader would stop unless the motor 25 be otherwise kept energized. This would fail to reset the reader to its starting position. In order to assure a complete resetting of the reader, a reset contact 78 is placed for immediate engagement by meter selector contactor 58 as it passes from contact 75. This contact 78 is connected to pole 79 of the double pole switch, which pole 79 engages contact 80 in the open position of pole 74 and engages contact 81 in the closed position of pole 74.

If only meter I is to be read, the double-pole switch is in the position shown, with pole 74 open and pole 79 closed on contact 80. Thus, when contactor 58 engages contact 78, it energizes contact 80 which is connected to a relay winding 82 of relay 83, so that this relay is closed. Closure of relay 83 completes a circuit from energizing line 34 through relay contact 84, contactor 85, and contact 86 to a holding winding 87. For all positions of selector contactor 58 except in its starting position, shown in FIG. 2, a cam 88, which is driven by shaft 59 and rotated concurrently with contactor 58, is out of engagement with a switch contactor 89 and this contactor 89 is closed on switch contact 90. In this closed position of contact 89 on contact 90, the circuit of relay holding winding 87 is completed. Thus, closure of relay 83 energizes its holding winding 87 which keeps this relay closed until the cam 88 opens switch contactor 89 when selector contactor has been reset, at which time encoder disc 28 also will be reset to its starting position.

Closure of relay 83 also completes a circuit from energizing line 34 through relay contacts 91 and its contactor 91' to line 39. This provides continued energization to motor 25 and main relay holding winding 41, thereby assuring continued operation of motor 25 until the selector contactor and encoder are reset. Continued operation of motor 25 not only moves encoder slip ring from engagement with brushes 35, 38, and 60, thus deenergizing contactor 58, it also concurrently moves contactor 58 out of engagement with contact 78. The latter two will deenergize relay winding 82. The relay 83 is, however, held closed by its holding winding 87, as explained. It also could transmit readings from other meters II, III, and IV if such be present. Since no such further readings are desired, a relay 93 is provided having contacts 94 in series in line 61 which energizes selector contactor 58. During normal operation relay 93 is deenergized and its contactor 95 engages relay contacts 94 closing the circuit of line 61 therethrough. Closure of relay 83 also energizes winding 96 of relay 93 through relay 83 contact 92 and contactor 92'. This opens the circuit of line 61 through contacts 94 and holds this circuit open as long as relay 83 is energized, thus maintaining selector contactor 58 deenergized and assuring against the transmittal of undesired reading signals to the central station while the system is being reset at this meter location. This provides for clear use of the information transmission line 51 by the next meter reader in the sequence without loss of time or interference while this resetting occurs.

When meter II is present and is to be read, switch pole 74 is closed on its contact 73 and is left in this position. This can be done when meter II is installed or whenever it is otherwise placed in service. Thus, after selector contactor 58 has completed the reading of meter I, including sending the identifying signal over contact I', it moves on to contact 75 and encoder disc contact tab 67 concurrently engages brush 68, thus concurrently energizing opposed relay coils 72 and 70, whereby relay 71 remains open and no read-out transfer signal is sent over line 22 to the sequentially next meter reader location.

Closure of switch pole 74 on its contact 73 also closes the other switch pole 79 on its contact 81 and opens its engagement with its contact 80. Thus, immediately as contactor 58 leaves contact 75, or slightly in advance thereof, it engages contact 78 and energizes relay winding 97 through switch pole 79 and its contact 81. This closes the relay and completes a circuit from energizing line 34 through relay contacts 98 by its contactor 99 to line 39 which keeps both motor 25 and main relay holding winding 41 energized for the period required to rotate encoder disc slip ring 37 back into engagement with brushes 35, 38, and 60 after having left contact therewith as its contact tab 67 passed out from under brush 68. Since relay winding 97 is energized through selector contactor 58, and energization of the latter through brush 60 is lost when the tab 67 end of slip ring 37 passes out of contact with brush 60, provision must be made to retain contactor 58 energized during the period while brushes 35 and 60 are out of contact with slip ring 37. This is done by closing a circuit from energizing line 34 through relay contacts 100 by relay contactor 101 concurrently with closure of the relay contactor 99 on contacts 98. This provides a holding circuit which keeps relay winding 97 energized for this deenergized period of brush 60, until the brushes 35, 38, and 60 again engage slip ring 37 and the reading and transmission of the encoded signals for meter II proceeds in the same manner as explained with reference to meter I.

After transmitting the readings of meter II dials A, B, C, and D, the meter location identifying numeral is transmitted by the encoder contacts 62 and the meter identifying number by contacts II'. As in the case of meter I, a two-position, two-pole switch is connected to contacts 75' and 78' for controlling operation of relays 71, 83, 93, and 97 in accordance with whether or not meter II is the last meter at that location which is to be read. If there is a meter III to be read it is processed as meters I and II, and if there is a meter IV to be read, it is read as the others also; however, no contacts or switch are provided after the meter identifying contacts IV' have been engaged, as these are at the end of a complete reading cycle. This number of meters is exemplary only and the equipment can be similarly built for any desired number of meters. As the selector contactor 58 moves to the blank contact at the position shown in FIG. 2, the cam 88 will have engaged and opened switch 89, thereby deenergizing holding coil 87 of relay 83 and consequently deenergizing motor 25 and the main relay holding coil 41 if these were energized through relay 83, and deenergizing relay 93 so that it is closed and set for the start of a new cycle. Thus, all units are brought to reset start conditions regardless of the number of meters to be read and the system is prevented from sending unwanted readings after the last meter to be read has been fully processed.

Each meter location, such as the houses 13' and 13'', are provided with reading equipment of the type described in detail, so that all locations can be read or bypassed in accordance with the presence or absence of connected meters and according to the number of meters to be read at each location, thus saving materially on the time required for a complete reporting for the entire system.

FIG. 4 illustrates another embodiment of the present invention in less sophisticated form and applied to a meter-reading telemetering system of the type disclosed in copending application Ser. No. 710,378, filed Mar. 4, 1968 on Automatic Remote Meter Reading System for Dial Type Meters, now U.S. Pat. 3,531,771. In this system, a single interrogation and information return line suffices for both services. Details of the meter dial reading device and encoder are not illustrated and will not be described as these are the same as in the above-mentioned copending application. The present system, however, does not utilize a frequency responsive interrogation signal relay, but sends an interrogation read-out signal from a central station 110 from an interrogator 111, as indicated by arrow 112, over line 113. This signal travels to the first meter location of the system, such as a house to contacts 114 and 115 of a bypass relay 116. If the house line 117 is energized, bypass relay winding 118, connected thereto, also is energized, and relay contactor 119 closes a circuit through relay contacts 114 and 120. If the house line 117 is not energized, bypass relay winding 118 is deenergized and relay contacts 114–120 are open circuited, thereby disconnecting the telemetering system at that location and closing a bypass circuit through relay contacts 115 and 121. In this latter condition, the interrogation read-out signal passes over line 122 to line 123 to the sequentially next meter location, such as house 124. At location 124 a system such as that shown in detail also is used, also having a bypass relay which functions the same as relay 116 to energize the system at that location if it be energized or to pass the read-out signal to the next location, such as house 125, if it be not energized. This continues until an energized location is reached, at which the read-out of the meter takes place.

As explained, when house line 117 is energized, relay 116 completes a circuit through its contacts 114–120, which passes the read-out signal to a main system energizing relay 126 winding 127. Energization of relay winding 127 closes a circuit by relay contactor 128 through contacts 129 from a source of energization 130, which preferably is d.c. since the encoding is a pulse system and d.c. facilitates and simplifies this type of system. This energizes line 131 connected to a switch pole 132 closed on a contact 133 by a cam 134. Contact 133 is connected to a line 135 which connects to a brush 136 of a motor 137 and thus motor 137 is energized. This motor provides the drive for operating the read-out and encoding devices of the system in the same manner as in the mentioned copending application.

The drive extends from the motor 137 through a gear box 138 to an encoder 139 by a drive shaft 140, to a dial selector 141 by a drive shaft 142, and to a meter identifying number coding disc cam 143 by a drive shaft 144. The relative speeds of these drive shafts is the same as for the corresponding shafts in the mentioned copending application for the reasons there explained. The selector drive shaft 142 drives both the selector contactor 145 and the cam 134 at the same speed.

When the motor starts up, it drives cam 134 out of engagement with switch pole 132 and pole 132 is suitably biased, as by a spring, to move out of engagement with contact 133. This removes a shunt across a holding winding 146 of relay 126 and places winding 146 in series between line 131 and line 135 to motor 137, thereby energizing the holding winding 146 by the motor current. This assures holding the relay 126 closed after the interrogation read-out signal has ceased and as long as the shunting circuit through switch pole 132 and contact 133 is open.

When a reading has been completed the motor will have driven the cam 134 back to the illustrated position and closed the shunting circuit through switch pole 132 and contact 133, thereby deenergizing holding winding 146. In this deenergized condition of relay 126, its contactor 128 closes a circuit through contacts 147 which connects line 123 to the next location 124 through line 148 to line 149 and a diode rectifier 150 to line 113 and the central station computer 151. The diode 150 prevents the initial interrogating read-out signal 112 from the central station to pass over line 149 through relay contacts 147, line 148, line 123 and to location 124 simultaneously with its passage to relay 126 winding 127, and thus prevents start up of the system at location 124, as well as that responsive to energization of relay 126.

Reading of the meter dials 152 is sequentially done in response to engagement of contacts 153, 154, 155, 156, and 157 by selector contactor 145 and the readings are encoded by the encoder 139 and transmitted by encoded pulses over line 158, all as fully explained in the mentioned copending application. Also, as therein explained, after all meter dials have been read and reported, the selector contactor 145 engages contact 159 which energizes a meter identifying number encoder contactor 160 while this encoder cam 143 moves the encoder 160 in and out of engagement with a contact 161 in a predetermined manner so as to transmit a plurality of coded spaced series of pulses over line 158 and back to the central station computer, all as explained in the mentioned copending application.

After this meter identifying coded number has been transmitted, the selector contactor 145 engages contact 162 which energizes line 148 and line 123 to the next meter location, thus transmitting a read-out signal thereto and starting up another telemetering reading system like that at the location described. Further movement of the selector contactor 145 returns it to its disengaged position as illustrated, while the cam 134 is concurrently moved into engagement with switch pole 132 and closes it on contact 133 which shunts relay holding winding 146. This deenergizes the relay 126 and its contactor 128 opens the circuit through its contacts 129 and closes a circuit through its contacts 147. This latter circuit completes an information return circuit from subsequent meter locations 124, 125, etc. through lines 123, 149, and 113 to the central station computer 151.

While particular embodiment of this invention have been illustrated and described, modifications thereof will occur to those skilled in the art. It is to be understood, therefore, that this invention is not to be limited to the exact details disclosed.

The invention claimed is:

1. A telemetering system for sequentially interrogating a plurality of meters at a plurality of locations and reading the meters and encoding said reading into signals corresponding to the digital indication read and encoding other signals for identifying the meter read and for transmitting said signals to a central station for processing, comprising:

a meter-reader at each meter location for reading meters and producing data signals and meter identifying signals and for transmitting said signals to the central station;

each of said meter-readers including a drive motor for driving said meter-readers, means at the central station for transmitting an initial interrogation read-out signal to the meter reader for the first of said plurality of meters, operation control means for initially energizing said motor in response to receipt of a read-out signal and having means for holding said motor energized subsequent to said initial energization for a predetermined operating cycle, presettable means at each of said meter-reader locations for selecting the number of meters to be read at that location and for automatically transmitting a transfer read-out signal to the sequentially next meter-reader of said plurality of locations on completion of the meter reading of the selected number of meters at the respective meter location; and means for resetting each respective meter reader to its starting condition after completion of the meter reading of the selected number of meters at its respective location and for then releasing said motor energization holding means.

2. A telemetering system as defined in claim 1 wherein each meter reader includes means for producing encoded trains of pulses as said data signals and another train of pulses as said meter identifying signals, and said operation control means includes means having contacts for connecting said motor to an energizing source in response to said initial read-out signal.

3. A telemetering system as defined in claim 2 wherein said operation control means read-out signal responsive means comprises a relay having an operating coil connected for response to said initial read-out signal for closing said contacts to energize said motor and a holding coil comprising said holding means connected for energization in response to a predetermined operation of said motor for holding closed said relay contacts during said operating cycle.

4. A telemetering system as defined in claim 3 having means for releasing said holding means after completion of said operating cycle and in response to a predetermined reader drive by said motor.

5. A telemetering system as defined in claim 4 wherein said releasing means comprises a shunting circuit operable to shunt out said holding coil in response to said predetermined reader drive by said motor.

6. A telemetering system as defined in claim 1 adapted to be connected to an energizing source and having means at each of said plurality of meter locations responsive to nonenergization of the system to be metered at the respective location for bypassing the meter-reader thereat and providing for transmitting a read-out signal to the sequentially next meter-reader.

7. A telemetering system as defined in claim 2 wherein said operation control means includes a relay having said contacts for connecting said motor to a source of energization and having an operating winding responsive to said read-out signal for closing said contacts and a holding winding energizable after a predetermined reader drive by said motor for holding said contacts closed and for releasing said contacts to open circuit position after said meter reader resetting, and means for by-passing a meter reader at a meter location not connected to said energizing source and for transferring the read-out signal to the sequentially next meter location.

8. A telemetering system as defined in claim 1 wherein said means for automatically transmitting said transfer read-out signal comprises a relay having an operating winding energized on completion of each meter reading and encoding thereof and of the meter identifying signals and having contacts adapted to be closed for transmitting said transfer read-out signal, and means including a differential winding on said relay energized concurrently with energization of said operating winding when another meter is to be read at the same location following completion of the reading cycle of a meter for negating the excitation of said relay operating winding and preventing closing of said relay contacts.

9. A telemetering system as defined in claim 1 wherein said means for automatically transmitting said transfer read-out signal comprises means for providing said transfer read-out signal following completion of each meter reading and meter identification signals at each meter location and means operable for preventing the providing of said transfer read-out signal when another meter remains to be read at said location.

10. In a telemetering system for sequentially interrogating a plurality of meters at a plurality of locations and reading the meters and encoding said readings into signals corresponding to the digital readings and encoding other signals for identifying the meter read and for transmitting said signals to a central station, comprising:

means at the central station for transmitting an initial read-out signal to a meter-reader location of said system to initiate operation thereof;

a meter-reader at each location for reading meters and producing data signals and meter identifying signals and for transmitting said signals to the central station;

each of said meter readers having a drive motor for driving said meter-readers;

operation control means for initially energizing said motor in response to a read-out signal and having means for holding said motor energized for a predetermined operating cycle; and settable means at each meter reader for preselecting the number of meters to be read and for automatically transmitting a transfer read-out signal to the sequentially next meter reader of said plurality of locations on completion of the meter reading and meter identification of the preselected number of meters at the respective meter location.

11. In a telemetering system, a meter reader as defined in claim 10, including means for automatically resetting it to starting conditions on completion of said meter reading and identification signal transmissions.

12. In a telemetering system, a meter reader as defined in claim 11 including means for automatically stopping said reader and providing for return of information signals from subsequent meter readers to the central station.

13. In a telemetering system, a meter reader as defined in claim 11 adapted sequentially to read a plurality of meters at its respective location and including means set in accordance with the plurality of meters to be read for automatically controlling the sequential reading and identifying of the plurality of meters for said setting thereof and for controlling the transmittal of said transfer read-out signal.

14. In a telemetering system, a meter reader as defined in claim 13 wherein said operation control means holds said motor energized until the respective meter reader is reset to a starting condition at the end of said operating cycle unaffected by the setting for the number of meters to be read and having means to prevent interference with subsequent meter readers due to continued energization and operation of said motor after completion of meter reading for which said reader is set and before the end of said operating cycle.

15. In a telemetering system, a meter-reader as defined in claim 10 including a digital dial contact device having a plurality of dial reading members one for each meter dial,

- each dial reading member having a plurality of digital contacts corresponding to the digits 1 to 10 on the respective dial and a movable contactor for engaging a digital contact corresponding to the dial digit value for the respective meter dial;
- dial selecting means for successively energizing said movable dial contactors of each dial reading member;
- an encoder having a mounting disc driven by said motor and having a signal pulse collector ring and a plurality of sets of spaced encoding contact elements mounted on said disc,
- the number of contact element sets corresponding to the number of dials on each meter to be read,
- said encoding contact elements each representing a digit successively from 1 to 10 and carried by and extending substantially radially of said mounting disc and varying in length progressively outwardly with the longest contact representing 1,
- a plurality of radially spaced brush means for engaging said encoding contact elements and connected to said dial reading member contacts respectively progressively from 1 to 10 radially outwardly whereby said radially spaced brush means successively respectively engage one to 10 of said encoding contact elements on rotation of said mounting disc and transmits respectively one to 10 signal pulses to said collector ring representing digits 1 to 10 according to the brush energized from the dial reading member contact engaged by the respective dial contactor; and
- means for transmitting said signal pulses to the central station.

\* \* \* \* \*